US011459930B2

(12) United States Patent
Fey

(10) Patent No.: US 11,459,930 B2
(45) Date of Patent: Oct. 4, 2022

(54) METHOD, COMPUTER UNIT AND COMPUTER PROGRAM FOR OPERATING A COMBUSTION ENGINE

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/492,845

(22) Filed: Oct. 4, 2021

(65) Prior Publication Data

US 2022/0112831 A1 Apr. 14, 2022

(30) Foreign Application Priority Data

Oct. 8, 2020 (DE) ...................... 10 2020 212 710.7

(51) Int. Cl.
*F01N 13/00* (2010.01)
*F01N 11/00* (2006.01)

(52) U.S. Cl.
CPC .......... *F01N 11/007* (2013.01); *F01N 13/008* (2013.01)

(58) Field of Classification Search
CPC ............................ F01N 11/007; F01N 13/008
See application file for complete search history.

(56) References Cited

U.S. PATENT DOCUMENTS

| 2008/0087259 | A1* | 4/2008 | Kato | ................... F02D 41/1458 |
| | | | | 123/672 |
| 2014/0338312 | A1* | 11/2014 | Yanase | ................ F02D 41/1456 |
| | | | | 60/276 |
| 2018/0112613 | A1* | 4/2018 | Odendall | ............ F02D 41/1441 |

FOREIGN PATENT DOCUMENTS

| DE | 102016222418 A1 | 5/2018 |
| DE | 102018216980 A1 | 4/2020 |
| DE | 102018251720 A1 | 7/2020 |
| JP | 4354068 B2 * | 10/2009 ........... F01N 3/0842 |

* cited by examiner

*Primary Examiner* — Anthony Ayala Delgado
(74) *Attorney, Agent, or Firm* — Michael Best & Friedrich LLP

(57) ABSTRACT

Operating a combustion engine with an exhaust gas aftertreatment system. In one example, a method includes determining a level of at least one exhaust gas component using a theoretical catalytic converter model in which at least one signal of a first exhaust gas sensor is input as a first signal, detecting a signal of a second exhaust gas sensor downstream of the exhaust gas catalytic converter as a second signal, determining a deviation of the second signal from a target signal, reinitializing the catalytic converter model if the deviation of the second signal from the target signal exceeds a predetermined threshold value, regulating the level by setting an air-fuel mixture supplied to the combustion engine according to a target level based on the determined level, determining a deviation between the first and the second signals, and correcting the first signal.

9 Claims, 2 Drawing Sheets

METHOD, COMPUTER UNIT AND COMPUTER PROGRAM FOR OPERATING A COMBUSTION ENGINE

BACKGROUND OF THE INVENTION

The present invention relates to a method for operating a combustion engine and a computing unit and a computer program for carrying it out.

In motor vehicle combustion engines, such as diesel engines, petrol engines or rotary piston engines, in the event of incomplete combustion of the air-fuel mixture a large number of combustion products are ejected in addition to nitrogen ($N_2$), carbon dioxide ($CO_2$) and water ($H_2O$), of which at least hydrocarbons (HC), carbon monoxide (CO) and nitrogen oxides ($NO_x$) are limited by law. According to the current prior art, the applicable exhaust gas limit values for motor vehicles can only be complied with by using catalytic exhaust gas aftertreatment. By using, for example, a three-way catalytic converter, the pollutant components mentioned can be converted to relatively harmless exhaust gas components, such as carbon dioxide, nitrogen and water.

A simultaneously high conversion rate for HC, CO and $NO_x$ is achieved with three-way catalytic converters only in a narrow lambda range around the stoichiometric operating point (lambda=1), the so-called "catalytic converter window". Typically, lambda control based on the signals from lambda sensors upstream and downstream of the catalytic converter is used to operate the catalytic converter in the catalytic converter window. To control the lambda value upstream of the catalytic converter, the oxygen content of the exhaust gas upstream of the catalytic converter is measured with the lambda sensor. Depending on this measured value, the control corrects the amount of fuel supplied to the combustion engine. For more precise control, the exhaust gas downstream of the catalytic converter is also analyzed with another lambda sensor. This signal is used for a master control which is superimposed on the lambda control upstream of the catalytic converter. As a lambda sensor downstream of the catalytic converter, a jump lambda sensor is usually used which has a very steep characteristic curve at lambda=1 and can therefore display lambda=1 very accurately.

In addition to the master control, which generally only regulates small deviations from lambda=1 and is designed to be comparatively slow, there is usually a functionality in the form of a lambda precontrol in current engine control systems which ensures that the catalytic converter window is quickly reached again after large deviations from lambda=1.

Many current control concepts have the disadvantage that they only detect leaving the catalytic converter window late on the basis of the voltage of the jump lambda sensor downstream of the catalytic converter.

An alternative to the control of the three-way catalytic converter based on the signal of a lambda sensor downstream of the catalytic converter is control of the average oxygen level of the catalytic converter. Since this average level is not measurable, it can only be modeled using a plant model. This type of control can detect impending breakthroughs at an early stage and can react to them before it actually happens. A corresponding model-based control of the level of a three-way catalytic converter based on the kinetics of the most important reactions taking place in the catalytic converter and the oxygen storage capacity is described in DE 10 2016 222 418 A1. In such model-based catalytic converter control, stored sets of model parameters can also be incorporated. An adaptation of the storage capacity of the catalytic converter depending on the current operating point is also possible. Such methods are known, for example, from DE 10 2018 216 980 A1 and DE 10 2018 251 720 A1.

SUMMARY OF THE INVENTION

According to the invention, a method for operating a combustion engine and a computing unit and a computer program for carrying it out with the features of the independent claims are proposed. Advantageous embodiments are the subject matter of the subordinate claims and the following description.

A method according to the invention for controlling a combustion engine with an exhaust gas aftertreatment system having an exhaust gas catalytic converter and at least two exhaust gas sensors, wherein at least one first exhaust gas sensor is arranged upstream of the exhaust gas catalytic converter and at least one second exhaust gas sensor is arranged downstream of the exhaust gas catalytic converter, includes determination of a level of at least one exhaust gas component in the exhaust gas catalytic converter which can be stored in the catalytic converter using a theoretical catalytic converter model in which at least one signal of the first exhaust gas sensor as an input variable is received as a first signal, detection of a signal of the second exhaust gas sensor downstream of the exhaust gas catalytic converter as a second signal, determination of a deviation of the second signal from a target signal, wherein the target signal corresponds to the signal which would be expected at the determined level, reinitialization of the catalytic converter model if the deviation of the second signal from the target signal exceeds a predetermined threshold value, so that the determined level after the reinitialization should bring about a target signal corresponding to the detected second signal, control of the level by setting an air-fuel mixture supplied to the combustion engine according to a target level based on the determined level, determination of a deviation between the first and the second signals following the re-initialization of the catalytic converter model and following control of the level to the target level, and correction of the first signal by means of a correction value determined as a function of the deviation between the first and the second signals, so that the deviation is reduced.

The control concept according to the invention has the fundamental advantage that it can detect an exit from the catalytic converter window on the basis of the modeled level at an early stage and thus contributes overall to lower pollutant emissions or more effective exhaust gas purification.

In the context of the present invention, reinitialization is understood to mean a step of the method in which a measured value (in particular the second signal) is used to change parameters of the calculation rule (of the theoretical catalytic converter model) in such a way that during the processing of the input variable(s) in the calculation rule, the catalytic converter level results in such a way that the measured signal matches the modeled level.

Advantageously, the first exhaust gas sensor is a broadband lambda sensor and/or the second exhaust gas sensor is a jump lambda sensor and/or the first and/or the second signals contain lambda values of the exhaust gas of the combustion engine. A broadband lambda sensor is particularly suitable for use upstream of the catalytic converter, since at this point a wide range of values can be stepped through during the operation of the combustion engine, while downstream of the catalytic converter the high precision of a jump lambda sensor in a narrow range of values contributes to the reliable monitoring of exhaust gas purification. This reduces uncertainties in the catalytic converter model by adapting a signal with greater uncertainty (the broadband lambda sensor, which has a much flatter characteristic curve and thus a greater measurement inaccuracy) on the basis of a particularly reliable signal (the jump lambda sensor, which has a particularly steep characteristic curve in the region of lambda=1). However, other exhaust gas sensors can also be used in connection with the invention, in particular those that measure or determine a concentration of an exhaust gas component, for example nitrogen oxide sensors.

The at least one exhaust gas component contains oxygen in particular. This is particularly relevant for the functionality, in particular the conversion capacity of the exhaust gas catalytic converter.

The correction value is preferably calculated as a product of the deviation between the first and the second signals with an attenuation factor selected in particular from a range of values between zero and one. In this way, overcompensation and thus "surging" of the correction can be avoided.

Here the attenuation factor is preferably chosen to be smaller, the larger is a difference between the second signal and the target signal. This reflects the fact that the lambda sensor downstream of the catalytic converter provides particularly reliable values with a lambda value around one (i.e. near the target signal in a normal operating mode), whereas the measured values are less resilient with a rising difference of the lambda value from one (i.e. further away from a regular target signal).

The correction of the first signal is preferably carried out by adding the correction value to the first signal. This results in particular in a particularly computationally economic correction if both signals already include a lambda value or if there is a linear dependence between the signal and the associated lambda value.

The invention is described below using the example of a three-way catalytic converter. The embodiments are mutatis mutandis also transferable to other catalytic converter types and the invention is not limited to the use of a three-way catalytic converter. In principle, all conceivable types of exhaust gas catalytic converters can be used which are capable of storing at least one exhaust gas component.

The core of the invention is to bring the modeled levels of the catalytic converter to a defined state, in which the levels of the real catalytic converter and the modeled levels match at least approximately, first by a reinitialization based on the signal of a lambda sensor downstream of the catalytic converter. Following this reinitialization, the level is adjusted at which minimum emissions and lambda=1 downstream of the catalytic converter are expected. After this level is adjusted, the deviation from 1 of the lambda measured with the help of the lambda sensor actually downstream of the catalytic converter is recorded. This deviation corresponds to the existing offset between the lambda upstream and downstream of the catalytic converter. Fluctuations of the lambda downstream of the catalytic converter in dynamic driving mode and tolerances of the lambda sensor downstream of the catalytic converter are taken into account by a low-pass filtering of the sensor signal and an attenuation factor that causes the determined offset to be adopted or adapted only proportionately. This increases the robustness of the process and avoids overcompensation of the offset. The method can be carried out multiple times directly in succession until the deviation of the lambda value from 1 actually measured downstream of the catalytic converter is sufficiently small. In this way, an existing offset can be completely adapted step by step within a short time.

A model-based control of a catalytic converter has the advantage that an imminent exit from the catalytic converter window can be detected earlier than with a master control based on the signal of an exhaust gas sensor downstream of the catalytic converter, so that the exit from the catalytic converter window can be counteracted by an early targeted correction of the air-fuel mixture before it actually happens. By extending the compensation of measurement and model uncertainties by the fast lambda offset adaptation according to the invention, the robustness of the model-based control can be further improved. In particular, larger lambda offsets can be adapted faster and more robustly at the same time. Emissions in the real driving mode can thus be further reduced. Stricter legal requirements can be met with lower costs for the catalytic converter.

The invention is described here using the example of an exhaust system comprising a broadband lambda sensor, a three-way catalytic converter and a jump lambda sensor arranged one after the other in the direction of flow. However, further or other catalytic converters, sensors and additional components, such as particulate filters, may also be provided which at least do not adversely affect the application of the method.

The present invention is based on an adaptive catalytic converter model. For example, a catalytic converter model may be provided which realizes a multi-stage adaptation with which uncertainties of measurement or model quantities, which are included in the plant model underlying the model, and uncertainties of the plant model are compensated.

Such a multi-stage adaptation combines, for example, a continuously working, very precise adaptation of smaller deviations and a discontinuous fast correction of larger deviations.

The continuous adaptation and the discontinuous correction can be based on signal values from different signal value ranges of a sensor, in particular a lambda sensor arranged downstream of the catalytic converter in the exhaust gas stream and thus on the output side, wherein however two basically different information items are derived from these signal values. Such a model allows the different significance of the signal values from the different signal value ranges to be taken into account in relation to the exhaust gas composition and in relation to the level of the at least one exhaust component in the catalytic converter.

In addition, multiple signal value ranges may be provided in which the continuous adaptation alone, the discontinuous correction alone or both together are active.

In the case of discontinuous correction, a modeled level is corrected according to the actual level, for example, if the voltage of an output lambda sensor indicates a breakthrough of rich or lean exhaust gas downstream of the catalytic converter and thus a too low or too high actual (oxygen) level. This correction is carried out discontinuously in order to be able to evaluate the reaction of the voltage of the lambda sensor downstream of the catalytic converter. Since this reaction is delayed due to the distance-related dead time and the storage behavior of the catalytic converter, the adaptive catalytic converter model may in particular provide for the correction to be carried out once at first if the lambda value of the signal of the lambda sensor arranged downstream of the catalytic converter allows a conclusion to be drawn about the actual (oxygen) level in the catalytic converter.

The invention builds on this discontinuous correction and supplements it with a lambda offset adaptation, since it was recognized that just in a state after such a correction of the modeled level a particularly well-defined state exists, which allows the most precise determination of the offset of the lambda sensor upstream of the catalytic converter based on the signal of the lambda sensor downstream of the catalytic converter.

With the continuous adaptation mentioned above, for example, the lambda signal of a jump lambda sensor downstream of the catalytic converter is compared with a modeled lambda signal downstream of the catalytic converter. From this comparison, a lambda offset can be derived between the lambda value upstream of the catalytic converter and the lambda value downstream of the catalytic converter. With the lambda offset, for example, a lambda target value formed by a precontrol is corrected. However, this continuous adaptation works much slower than the discontinuous correction described above and is therefore not suitable for resolving large offsets, as it would greatly reduce the ability to reach the catalytic converter window. The present invention closes exactly this gap in a particularly advantageous way in the cases of large offsets of the lambda sensor upstream of the catalytic converter.

A computing unit according to the invention, for example a control unit of a motor vehicle, is set up, in particular programmatically, to carry out a method according to the invention.

Also the implementation of a method according to the invention in the form of a computer program or a computer program product with program code for carrying out all steps of the method is advantageous, since this causes particularly low costs, in particular if an executing control unit is still being used for other tasks and is therefore already present. Suitable media for the provision of the computer program are in particular magnetic, optical and electrical memories, such as hard disks, flash memories, EEPROMs, DVDs, etc. It is also possible to download a program via computer networks (Internet, intranet, etc.).

BRIEF DESCRIPTION OF THE DRAWINGS

Further advantages and embodiments of the invention result from the description and the enclosed drawing.

The invention is illustrated schematically in the drawing by means of an exemplary embodiment and is described below with reference to the drawing.

DETAILED DESCRIPTION

Figure 1:
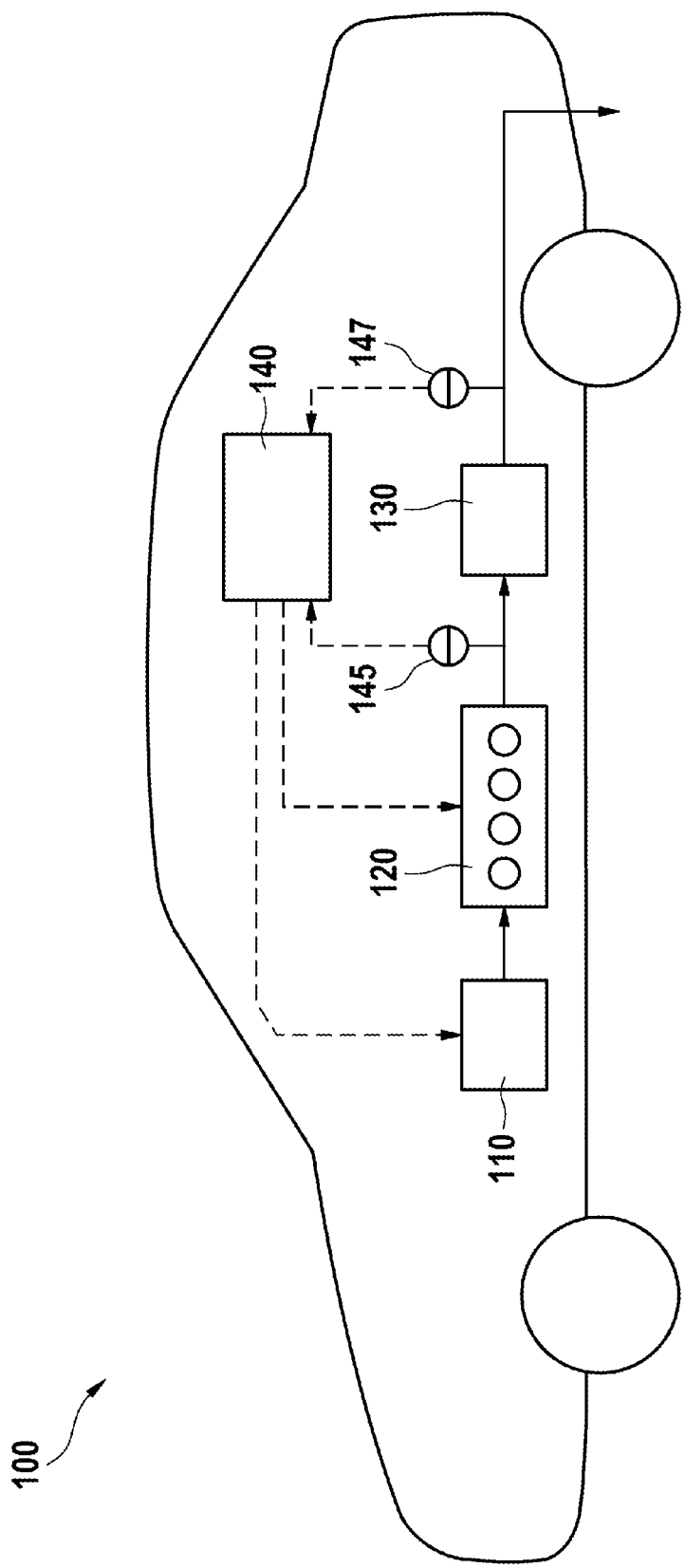
FIG. 1 shows a schematic representation of a vehicle in which a method according to the invention can be used.

In FIG. 1, a vehicle 100, in which a method according to the invention can be used, is schematically shown as a block diagram. The vehicle 100 is preferably set up for carrying out a method 200 according to FIG. 2 and has a combustion engine 120, for example a petrol engine, a catalytic converter 130 and a computing unit 140. Further, the vehicle 100 may comprise a fuel preparation device 110, for example in the form of injection pump(s), turbocharger(s), etc. or combinations thereof.

Furthermore, such a vehicle has (exhaust gas) sensors 145, 147, in particular lambda sensors, which are arranged upstream and downstream of the catalytic converter 130 in an exhaust system of the vehicle 100.

The computing unit controls, among other things, the operation of the combustion engine 120, for example by controlling ignition timings, valve opening times as well as composition, quantity and/or pressure of the fuel-air mixture provided by the fuel preparation device 110.

Figure 2:
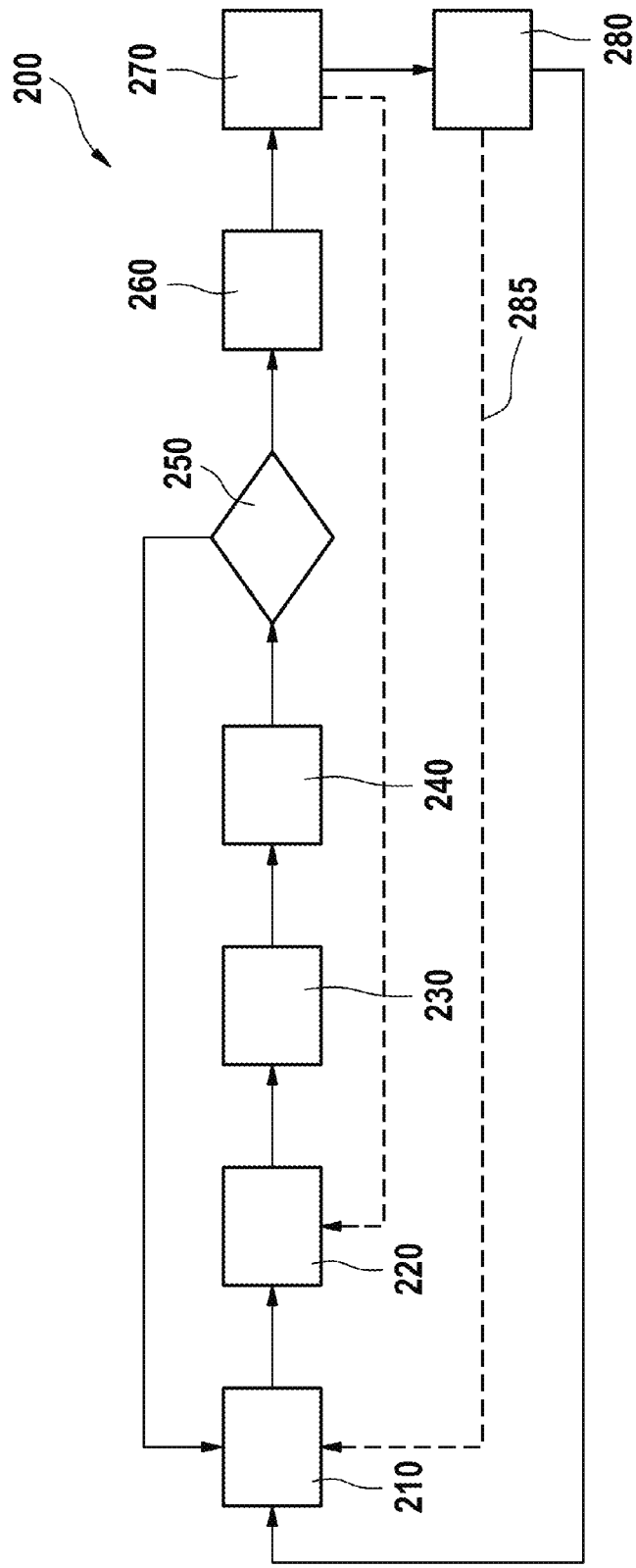
FIG. 2 shows an advantageous embodiment of a method according to the invention in the form of a flowchart.

The computing unit 140 is advantageously set up to further carry out the method 200 illustrated in FIG. 2 according to a preferred embodiment of the invention.

Exhaust gas produced during the operation of the combustion engine 120 is supplied to the catalytic converter 130. Upstream of the catalytic converter 130, in a first step 210 of the method 200 the air-fuel ratio lambda of the exhaust gas is measured by means of a first lambda sensor 145 and this first lambda value is transmitted to the computing unit 140.

A level of at least one exhaust gas component in the catalytic converter 130 is calculated in a step 220 depending on the lambda value determined in step 210 upstream of the catalytic converter 130. This concerns an oxygen level, for example, but a corresponding level in the catalytic converter 130 can also be determined for other exhaust gas components, for example nitrogen oxides.

Reactions of exhaust gas components with each other are accelerated or only enabled by the catalytic converter, so that harmful components, such as carbon monoxide, nitrogen oxides and hydrocarbons which are not completely bound are converted into relatively harmless products such as water vapor, nitrogen and carbon dioxide. Downstream of the catalytic converter 130, a second lambda value is determined in a step 230 by a second lambda sensor 147 and transmitted to the computing unit 140.

The first and the second lambda values may deviate from each other temporarily or permanently since the compositions of the exhaust gas upstream and downstream of the catalytic converter 130 deviate from each other due to the reactions in the catalytic converter 130. In addition, the exhaust gas needs a certain amount of time to flow through the catalytic converter 130 (so-called dead time). This dead time depends in particular on a current volume flow of the exhaust gas, i.e. on an actual operating state of the internal combustion engine 120. For example, when the combustion engine 120 is operating under full load, a higher amount of exhaust gas per unit of time is produced than with an idle machine. As a result, the current dead time changes depending on the operating state of the combustion engine 120 since the volume of the catalytic converter 130 is constant.

To simplify, these explanations are based on an exemplary emission minimum at a lambda value of one. However, the invention is also applicable if the target level for achieving minimum emissions corresponds to a target lambda value deviating from lambda=1.

As mentioned, the present invention is based on the signal of the exhaust gas sensor 147 downstream of the catalytic converter 130. In particular, it takes advantage of the fact that if the lambda sensor 147 clearly indicates a high or a low voltage downstream of the catalytic converter 130, the voltage signal correlates with the current (oxygen) level in the catalytic converter 130. This is particularly the case if the sensor voltage does not correspond to a lambda in the region of 1. In this case, the catalytic converter 130 is free of oxygen to such an extent or filled with oxygen to such an extent that rich or lean exhaust gas breaks through. This is used according to the invention to reinitialize one or more modeled levels, for example the modeled oxygen levels in multiple axial regions of the catalytic converter 130, when a clearly high or low voltage of the lambda sensor 147 occurs downstream of the catalytic converter 130.

Accordingly, in a step 240, a deviation is determined between the sensor signal of the lambda sensor 147 downstream of the catalytic converter 130 determined in step 230 and a target signal corresponding to a signal to be expected on the basis of the catalytic converter level determined in step 220. The target signal can correspond in particular to a lambda value of one or to a lambda value close to one in a stationary operating state of the combustion engine 120, i.e. an operating state with a constant load requirement.

In a step 250, the deviation determined in step 240 of the actual lambda value downstream of the catalytic converter 130 from the expected value is compared with a threshold value. If the deviation is less than the threshold value, the method 200 returns to step 210. On the other hand, if the deviation reaches or exceeds the threshold value, the method 200 proceeds with a step 260 in which the catalytic converter model is reinitialized on the basis of the sensor signal determined downstream of the catalytic converter 130. By this reinitialization 260, the modeled levels of the catalytic converter 130 are brought into a defined state in which they agree at least approximately well with the corresponding levels of the real catalytic converter 130.

Such a discontinuous correction or reinitialization 260 of the modeled levels leads to a deviation of the average modeled level from a predetermined target value. This deviation is subsequently corrected in a step 270. It leads to an adjustment of the air-fuel mixture towards the target value of the level control and brings the catalytic converter 130 very quickly towards the catalytic converter window. It thus leads directly to an improvement in emissions and at the same time brings the catalytic converter 130 into a defined state in which lambda=1 (or a lambda target value close to one) should be expected downstream of the catalytic converter 130. However, the catalytic converter window is only actually reached and lambda=1 will only actually occur downstream of the catalytic converter 130 if the signal of the lambda sensor 145 upstream of the catalytic converter 130, on which the modeling of the corrected oxygen level is based, has no offset. If this is the case, then lambda is not=1 downstream of the catalytic converter 130, but a lambda value that differs from lambda=1 by this offset.

Once the oxygen level is corrected after reinitialization (in step 260), the deviation of the actual lambda values downstream of the catalytic converter 130 from lambda=1 (or from the lambda target value) is recorded in a step 280 with the help of the lambda sensor 147 arranged downstream of the catalytic converter 130. On the basis of this deviation, a correction value 285 is determined, which is subsequently taken into account when determining the lambda value upstream of the catalytic converter 130. In particular, this correction value 285 is a number which is added to the lambda value upstream of the catalytic converter 130 measured in step 210. It goes without saying that the detection of the deviation only makes sense if the signal of the lambda sensor 147 downstream of the catalytic converter 130 is trustworthy and in particular if this sensor 147 is ready for operation. Optionally, a waiting time or a minimum amount of gas can also be provided, which must be waited for or passed through before the deviation is detected. In this way, account can be taken, in particular, of the dead time already mentioned.

After step 280, the method 200 returns to step 210, wherein in the new step 210 the determined correction value 285 is taken into account when determining the lambda value upstream of the catalytic converter 130.

Since it can be assumed that the lambda value downstream of the catalytic converter 130 is not constant in dynamic driving mode, but can fluctuate about an average value, the signal of the lambda sensor 147 downstream of the catalytic converter 130 is preferably low-pass filtered. This means that the deviation from lambda=1 of the low-pass filtered lambda signal of the sensor 147 downstream of the catalytic converter 130 is recorded and interpreted as an offset between the lambda value upstream of the catalytic converter 130 and the lambda value downstream of the catalytic converter 130.

Since the lambda value accuracy of the signal of a jump lambda sensor 147 downstream of the catalytic converter 130, apart from lambda=1, may be limited by temperature effects, cross-sensitivities and the flat characteristic of the voltage-lambda characteristic curve, it is also provided to adopt the determined offset as a correction value 285 only proportionally, for example only at 50%, with the help of an attenuation factor. Preferably, the attenuation is amplified further away from lambda=1 and the greater the reduction, the closer is the measured sensor signal to lambda=1, because the lambda accuracy is highest there. The robustness of the offset correction is increased by the proportionate adoption, which certainly avoids overcompensation of the offset, which could lead to a rise in offset adaptation and increased emissions.

The correction value 285 determined in this way is preferably used for the adaptation or correction of the signal of the lambda sensor 145 upstream of the catalytic converter 130. With an adopted attenuation factor of 50%, the offset which is still present after a first adaptation step between the lambda value upstream of the catalytic converter 130 and the lambda value downstream of the catalytic converter 130 is only half as large as originally.

If the voltage of the lambda sensor 147 downstream of the catalytic converter 130 again indicates a clearly high or low voltage, the method 200 is repeated, if necessary multiple times. Optionally, the method 200 can be repeated even if the signal of the lambda sensor 147 downstream of the catalytic converter 130 varies in a direction that does not correspond to that which is expected as a result of reinitialization, for example in the case of a low sensor voltage if the sensor voltage after reinitialization initially varies towards a higher sensor voltage, but then varies towards a low sensor voltage again. Since the attenuation factor is reduced more, the closer to lambda=1 is the measured signal of the lambda sensor 147 downstream of the catalytic converter 130, more of the offset is adapted proportionally with each step. In this way, even a greater lambda offset due to multiple successive reinitialization and adaptation steps can be fully adapted quickly and robustly.

The invention claimed is:

1. A method (200) for the operation of a combustion engine (120) with an exhaust aftertreatment system having an exhaust gas catalytic converter (130) and at least two exhaust gas sensors (145, 147), wherein at least one first exhaust gas sensor (145) is arranged upstream of the exhaust gas catalytic converter (130) and at least one second exhaust gas sensor (147) is arranged downstream of the exhaust gas catalytic converter (130), the method comprising:

determining (220) a level of at least one exhaust component in the exhaust gas catalytic converter (130) which can be stored in the catalytic converter (130) using a theoretical catalytic converter model in which at least one signal from the first exhaust gas sensor (145) as an input variable is input as a first signal, detecting (230) a signal from the second exhaust sensor (147) downstream of the exhaust gas catalytic converter (130) as a second signal, determining (240) a deviation of the second signal from a target signal, wherein the target signal corresponds to the signal which would be expected at the determined level in the catalytic converter (130), reinitializing (260) the catalytic converter model when the deviation of the second signal from the target signal exceeds a predetermined threshold value, so that the determined level after the reinitialization (260) brings about a target signal which corresponds to the detected second signal, regulating (270) the level in the exhaust gas catalytic converter (130) by setting an air-fuel mixture supplied to the combustion engine (120) according to a target level based on the determined level, determining (280) a deviation between the first and the second signals following the reinitializing (260) of the catalytic converter model and following regulating (270) the level to the target level, and correcting the first signal by means of a correction value (285) determined as a function of the deviation between the first and second signals, so that the deviation between the first and the second signals is reduced.

2. The method (200) according to claim 1, wherein the first exhaust gas sensor (145) is a broadband lambda sensor and the second exhaust gas sensor (147) is a jump lambda sensor.

3. The method (200) according to claim 1, wherein the at least one exhaust gas component contains oxygen.

4. The method (200) according to claim 1, wherein the correction value (285) is calculated as a product of the deviation between the first and second signals with an attenuation factor.

5. The method (200) according to claim 4, wherein the attenuation factor is chosen to be smaller, the greater a difference between the second signal and the target signal.

6. The method (200) according to claim 1, wherein the correction of the first signal is carried out by adding the correction value (285) to the first signal.

7. The method (200) according to claim 1, wherein the first and the second signals contain lambda values.

8. A computing unit (140) configure to operate a combustion engine (120) with an exhaust aftertreatment system having an exhaust gas catalytic converter (130) and at least two exhaust gas sensors (145, 147), wherein at least one first exhaust gas sensor (145) is arranged upstream of the exhaust gas catalytic converter (130) and at least one second exhaust gas sensor (147) is arranged downstream of the exhaust gas catalytic converter (130), by:

determining (220) a level of at least one exhaust component in the exhaust gas catalytic converter (130) which can be stored in the catalytic converter (130) using a theoretical catalytic converter model in which at least one signal from the first exhaust gas sensor (145) as an input variable is input as a first signal, detecting (230) a signal from the second exhaust sensor (147) downstream of the exhaust gas catalytic converter (130) as a second signal, determining (240) a deviation of the second signal from a target signal, wherein the target signal corresponds to the signal which would be expected at the determined level in the catalytic converter (130), reinitializing (260) the catalytic converter model when the deviation of the second signal from the target signal exceeds a predetermined threshold value, so that the determined level after the reinitialization (260) brings about a target signal which corresponds to the detected second signal, regulating (270) the level in the exhaust gas catalytic converter (130) by setting an air-fuel mixture supplied to the combustion engine (120) according to a target level based on the determined level, determining (280) a deviation between the first and the second signals following the reinitializing (260) of the catalytic converter model and following regulating (270) the level to the target level, and correcting the first signal by means of a correction value (285) determined as a function of the deviation between the first and second signals, so that the deviation between the first and the second signals is reduced.

9. A non-transitory, computer-readable medium containing instructions that when executed by a computer cause the computer to operate a combustion engine (120) with an exhaust aftertreatment system having an exhaust gas catalytic converter (130) and at least two exhaust gas sensors (145, 147), wherein at least one first exhaust gas sensor (145) is arranged upstream of the exhaust gas catalytic converter (130) and at least one second exhaust gas sensor (147) is arranged downstream of the exhaust gas catalytic converter (130), by:

determining (220) a level of at least one exhaust component in the exhaust gas catalytic converter (130) which can be stored in the catalytic converter (130) using a theoretical catalytic converter model in which at least one signal from the first exhaust gas sensor (145) as an input variable is input as a first signal, detecting (230) a signal from the second exhaust sensor (147) downstream of the exhaust gas catalytic converter (130) as a second signal, determining (240) a deviation of the second signal from a target signal, wherein the target signal corresponds to the signal which would be expected at the determined level in the catalytic converter (130), reinitializing (260) the catalytic converter model when the deviation of the second signal from the target signal exceeds a predetermined threshold value, so that the determined level after the reinitialization (260) brings about a target signal which corresponds to the detected second signal, regulating (270) the level in the exhaust gas catalytic converter (130) by setting an air-fuel mixture supplied to the combustion engine (120) according to a target level based on the determined level, determining (280) a deviation between the first and the second signals following the reinitializing (260) of the catalytic converter model and following regulating (270) the level to the target level, and correcting the first signal by means of a correction value (285) determined as a function of the deviation between the first and second signals, so that the deviation between the first and the second signals is reduced.

* * * * *